US009100399B2

(12) United States Patent
Doyle et al.

(10) Patent No.: US 9,100,399 B2
(45) Date of Patent: Aug. 4, 2015

(54) PORTABLE VIRTUAL SYSTEMS FOR COMPOSITE SOLUTIONS

(75) Inventors: Ronald P. Doyle, Raleigh, NC (US); Indrajit Poddar, Sewickley, PA (US); Yi-Hsiu H. Wei, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 152 days.

(21) Appl. No.: 13/538,164

(22) Filed: Jun. 29, 2012

(65) Prior Publication Data

US 2014/0003284 A1 Jan. 2, 2014

(51) Int. Cl.
*G06F 15/173* (2006.01)
*H04L 29/08* (2006.01)

(52) U.S. Cl.
CPC .................................... *H04L 67/10* (2013.01)

(58) Field of Classification Search
CPC ....... H04L 61/20; H04L 61/25; H04L 61/103; H04L 61/1511; H04L 61/2046; H04L 61/3075; H04L 67/10; H04N 21/443; H04N 21/4437; G06F 9/45533
USPC .......................................... 709/223, 226, 227
See application file for complete search history.

(56) References Cited

U.S. PATENT DOCUMENTS

| 7,702,808 | B2 * | 4/2010 | Wiget et al. ................... 709/238 |
| 7,852,789 | B2 * | 12/2010 | Satterlee et al. .............. 370/255 |
| 8,068,817 | B1 * | 11/2011 | Viswanath et al. ........ 455/414.1 |
| 8,108,855 | B2 | 1/2012 | Dias et al. |
| 2003/0172184 | A1 * | 9/2003 | Kong ............................ 709/245 |
| 2006/0153211 | A1 * | 7/2006 | Fujino ........................... 370/401 |
| 2007/0112962 | A1 * | 5/2007 | Lewontin ...................... 709/227 |
| 2008/0317039 | A1 * | 12/2008 | Satterlee et al. ........... 370/395.5 |
| 2009/0288084 | A1 * | 11/2009 | Astete et al. .................... 718/1 |
| 2010/0095297 | A1 * | 4/2010 | Sethi et al. ....................... 718/1 |
| 2012/0317252 | A1 * | 12/2012 | Vemulapalli et al. ......... 709/221 |
| 2013/0290506 | A1 * | 10/2013 | Astete et al. .................. 709/223 |
| 2013/0290960 | A1 * | 10/2013 | Astete et al. ..................... 718/1 |
| 2013/0308641 | A1 * | 11/2013 | Ackley .......................... 370/392 |
| 2013/0347072 | A1 * | 12/2013 | Dinha .............................. 726/4 |
| 2015/0082302 | A1 * | 3/2015 | Cheng et al. ...................... 718/1 |

* cited by examiner

*Primary Examiner* — Thu Ha Nguyen
(74) *Attorney, Agent, or Firm* — Stephen R. Tkacs; Stephen J. Walder, Jr.; Thomas E. Tyson (57) ABSTRACT

A mechanism is provided in a data processing system for providing portable composite solutions. The mechanism deploys a set of virtual images for a plurality of components of a composite solution to a build environment to form a set of virtual machines. The mechanism deploys a network virtual image to the build environment to form a network virtual machine. The network virtual machine comprises a router. The mechanism configures the router to create a private subnet with a set of fixed addresses and set of host names for the composite solution. Optionally, the mechanism may discover the fixed addresses during the build phase. The mechanism optionally installs middleware components to the set of virtual machines for the composite solution to form a set of solution virtual machines. The mechanism captures the set of solution virtual machines as a set of solution virtual images as a portable composite solution.

23 Claims, 9 Drawing Sheets

PORTABLE VIRTUAL SYSTEMS FOR COMPOSITE SOLUTIONS

BACKGROUND

The present application relates generally to an improved data processing apparatus and method and more specifically to mechanisms for building and deploying portable composite solutions.

A composite solution is a set of solution components that work together to provide the functions that the solution is to provide. For example, a communications solution may include email, chat, video conferencing, and a directory service. One may build a composite solution by constructing virtual images of the solution components and configuring the components to work together.

It is difficult to reuse virtual images for composite solutions due to Internet Protocol (IP) addresses or host names being built into the pre-installed middleware configuration. Constructing the images from scratch can take hours or days. Reconfiguring the host name or IP addresses requires potentially expensive and time consuming development of custom scripts and support for such changes in the middleware product itself. It is also difficult to create and deploy multi-tiered applications with network components, such as firewalls and load balancers. It is also difficult to on-board solutions delivered in pre-built virtual images into cloud environments. Furthermore, it is time consuming to set up a disaster recovery configuration for composite solutions.

SUMMARY

In one illustrative embodiment, a method is provided in a data processing system for providing portable composite solutions. The method comprises deploying a set of virtual images for a plurality of components of a composite solution to a build environment to form a set of virtual machines. The plurality of components provides functions of the composite solution. The method further comprises deploying a network virtual image to the build environment to form a network virtual machine. The network virtual machine comprises a router. The method further comprises configuring the router to create a private subnet with a set of fixed addresses and set of host names for the composite solution. The method further comprises capturing the set of virtual machines as a set of solution virtual images. The method further comprises storing the set of solution virtual images as a portable composite solution.

In other illustrative embodiments, a computer program product comprising a computer useable or readable medium having a computer readable program is provided. The computer readable program, when executed on a computing device, causes the computing device to perform various ones of, and combinations of the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide a mechanism for building portable composite solutions. The mechanism provides a virtual networking component for address translation and isolation. The virtual network component includes a router, a network address translation (NAT) component, a firewall, and a name server. The mechanism configures the router to create a fixed private subnet within a special set of fixed addresses and host names for the composite solution. In one example embodiment for the purpose of ease of on-boarding existing applications installed in virtual images, the special set of fixed addresses and host names my be derived by querying the network configuration parameters of existing virtual images with middleware components installed in them. The mechanism configures the firewall so that no traffic leaves the private subnet unless it goes through the NAT component. The mechanism configures the name server with the host names mapped to the set of fixed addresses. The mechanism adds an image construction tool capable of installing middleware components and virtual machines into the private subnet. The mechanism uses the private subnet, the list of fixed addresses, and the list of host names to create the virtual machines and install the middleware components for the composite solution.

In an example embodiment, in addition to firewall configuration, the mechanism may also configure a static address resolution protocol (ARP) table so the set of fixed addresses are mapped to specific media access control (MAC) addresses for virtual machine instances that are part of the solution instance being deployed. This ensures that the router virtual machine does not get confused with two solution virtual machines with exactly the same addresses in the same physical network. The mechanism may also have a restriction that all component virtual machines of a solution should run on the same hypervisor.

The illustrative embodiments provide a mechanism for deploying portable composite solutions. The mechanism deploys the virtual network component virtual image to create the private subnet in the target environment. The mechanism obtains the set of externally accessible addresses in the target environment assigned for the solution corresponding to a subset of the set of fixed addresses. The mechanism configures the NAT component with the list of externally accessible addresses and the list of fixed addresses so that only some of the solution virtual machines can be accessed externally with the assigned addresses. In one example embodiment, the mechanism may use port forwarding techniques in the NAT configuration. The mechanism then deploys the virtual images in the composite solution image set to the private subnet.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It my be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 1:
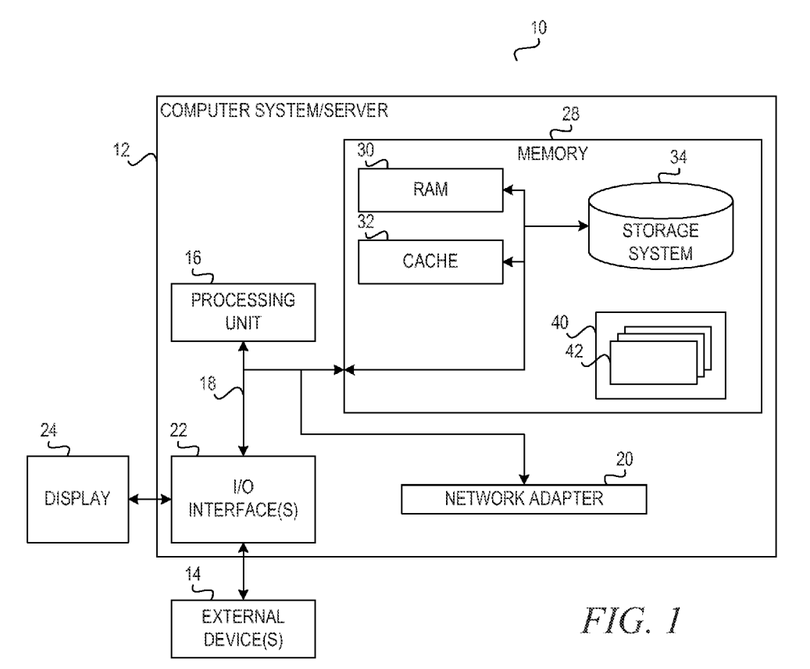
FIG. 1 depicts a cloud computing node according to an illustrative embodiment.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 0 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may, include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, hut are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As wilt be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein. Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
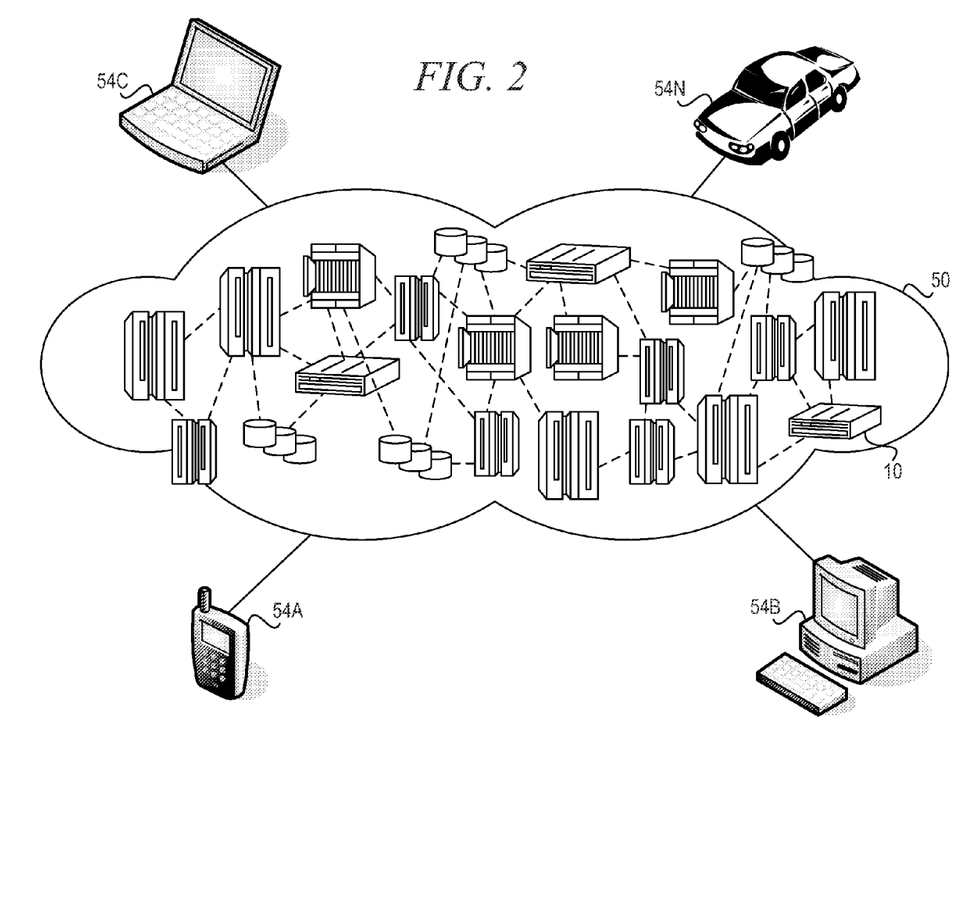
FIG. 2 depicts a cloud computing environment according an illustrative embodiment.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
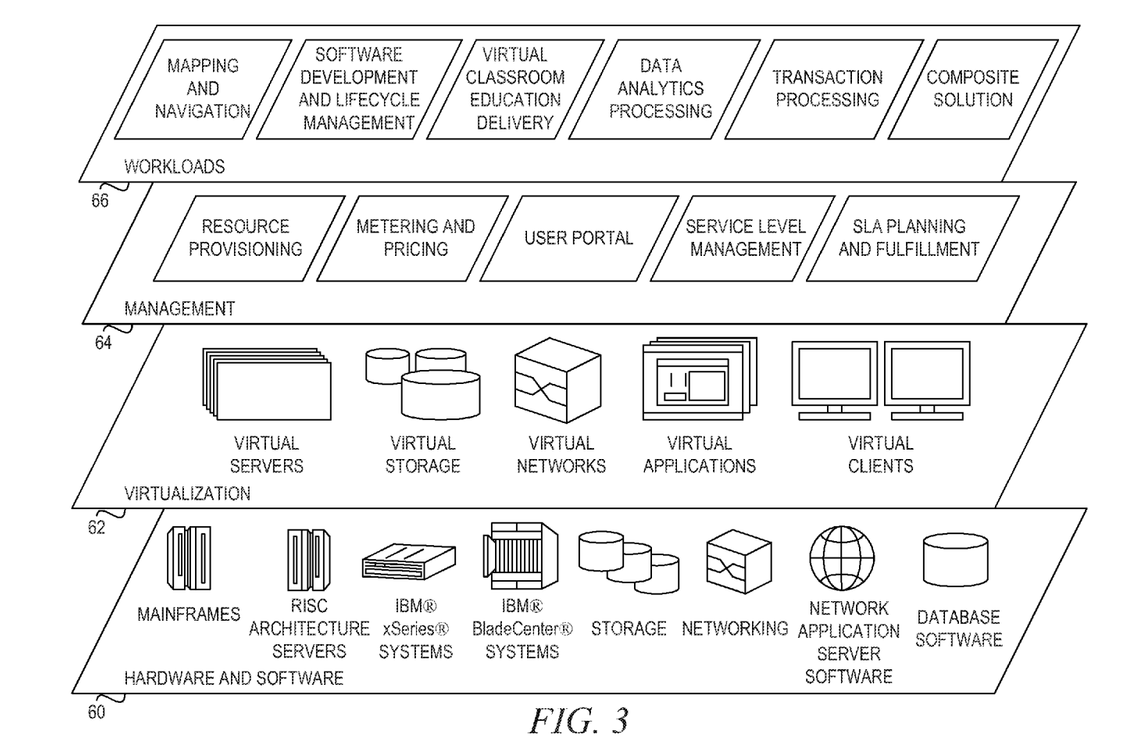
FIG. 3 depicts abstraction model layers according to an illustrative embodiment.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software, (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and composite solution.

Figure 4:
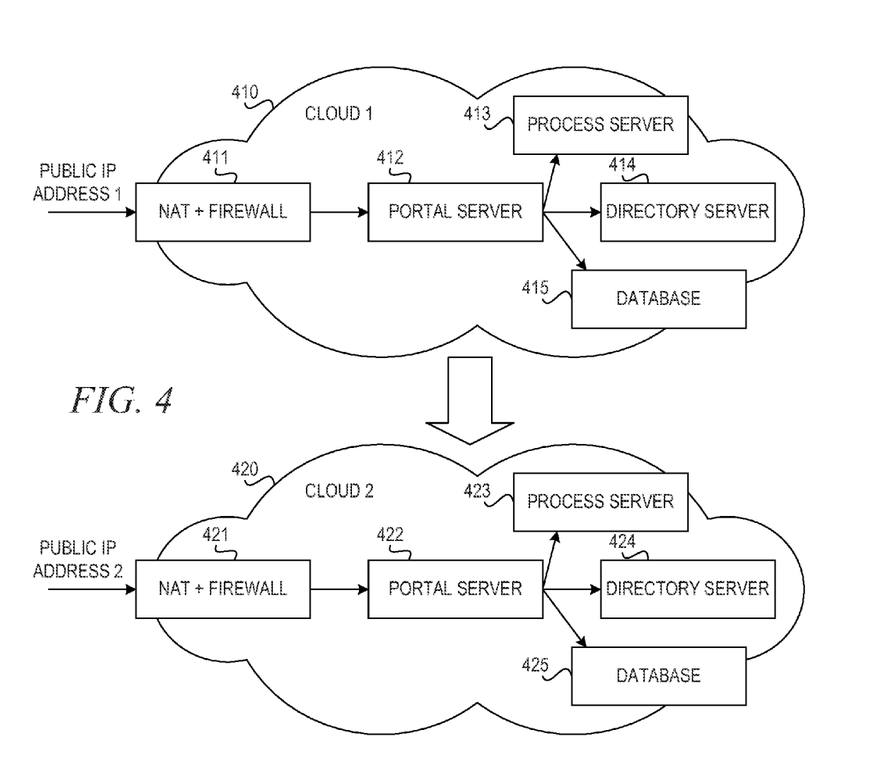
FIG. 4 depicts composite solution portability through virtual networking in accordance with an illustrative embodiment.

FIG. 4 depicts composite solution portability through virtual networking in accordance with an illustrative embodiment. In the depicted example, the composite solution exists in cloud 1 410 and includes a portal server 412, a process server 413, a directory server 414, and a database 415. The portal server 412 communicates with process server 413, directory server 414, and database 415. Portal server 412, process server 413, directory server 414, and database 415 are solution components that make up the composite solution.

In accordance with an illustrative embodiment, a mechanism is provided for building portable composite solutions. The mechanism provides a virtual networking component 411 for address translation and isolation. The virtual network component 411 includes a router, a network address translation (NAT) component, a firewall, and a name server. The mechanism configures the router to create a fixed private subnet within a special set of fixed addresses and host names for the composite solution. The mechanism configures the firewall so that no traffic leaves the private subnet unless it goes through the NAT component, via public Internet Protocol (IP) address 1, which is referred to as "network fencing," The mechanism configures the name server with the host names mapped to the set of fixed addresses. A client may then access the composite solution in cloud 1 410 with public IP address 1.

The composite solution may then be deployed or migrated to cloud 2 420. The deployed composite solution would then include a portal server 422, a process server 423, a directory server 424, and a database 425. In accordance with the illustrative embodiment, a mechanism is provided for deploying the portable composite solution. The mechanism deploys the virtual network component virtual image to create the private subnet in cloud 2 420. The mechanism obtains public address 2 in the target environment assigned for the solution corresponding to a subset of the set of fixed addresses. The mechanism configures the NAT component in the virtual network component 421 with public IP address 2 and the list of fixed addresses so that only some of the solution virtual machines can be accessed externally with the assigned addresses. The mechanism then deploys the virtual images in the composite solution image set to the private subnet. In accordance with the illustrative embodiment, deployment only changes the public IP address.

Figures 5, 7:
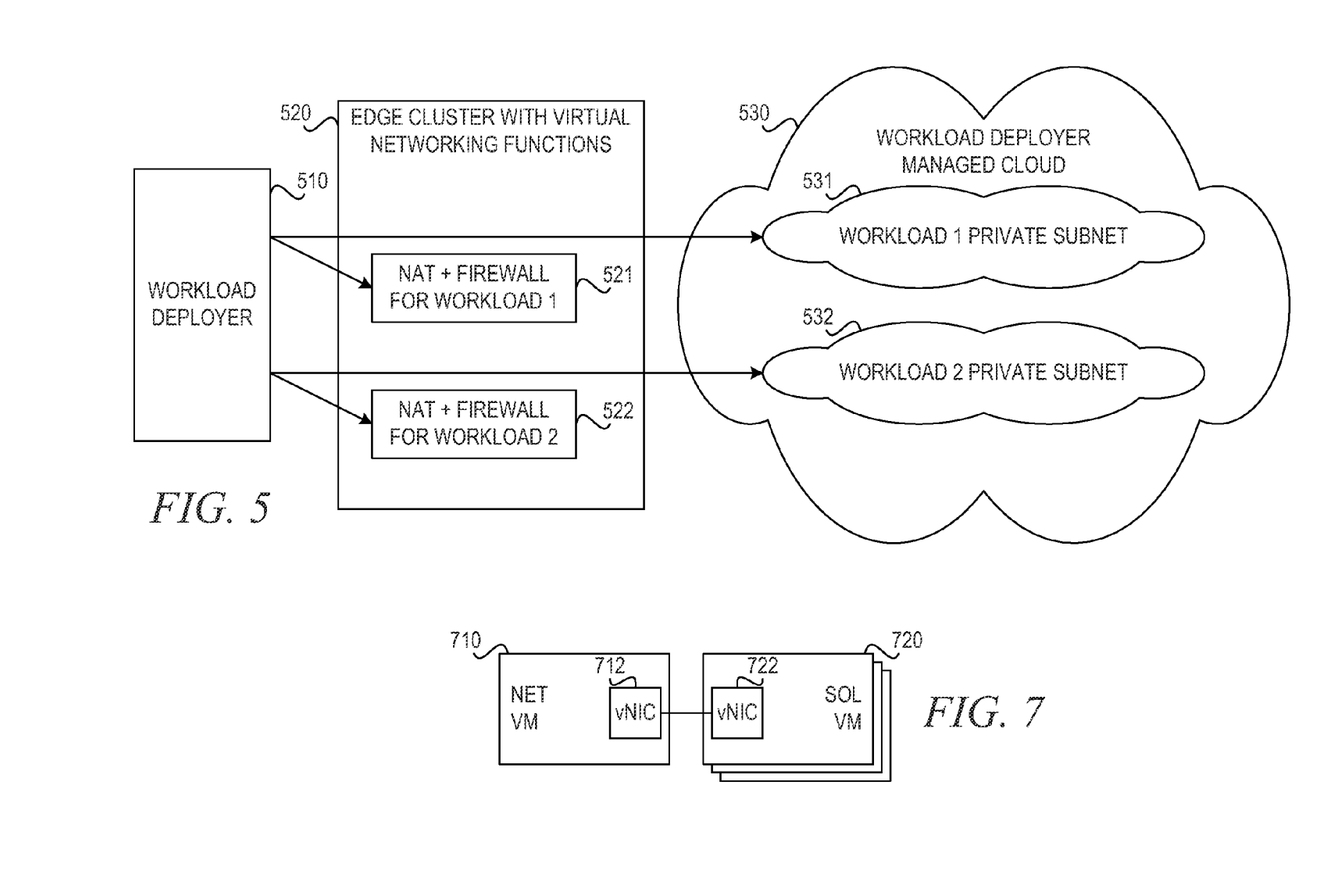
FIG. 5 depicts an edge cluster for virtual networking in accordance with an illustrative embodiment.
FIG. 7 is a block diagram illustrating virtual network interface pair forwarding in accordance with an illustrative embodiment.

FIG. 5 depicts an edge cluster for virtual networking in accordance with an illustrative embodiment. Workload deployer 510 deploys virtual network component 521 for workload 1 and virtual network component 522 for workload 2 in edge cluster with virtual networking functions 520. Workload deployer 510 also deploys workload 1 private subnet 531 and workload 2 private subnet 532 in workload deployer managed cloud 530. Workload 1 and workload 2 may be different composite solutions or different instances of the same composite solution deployed in the same cloud environment.

Figure 6:
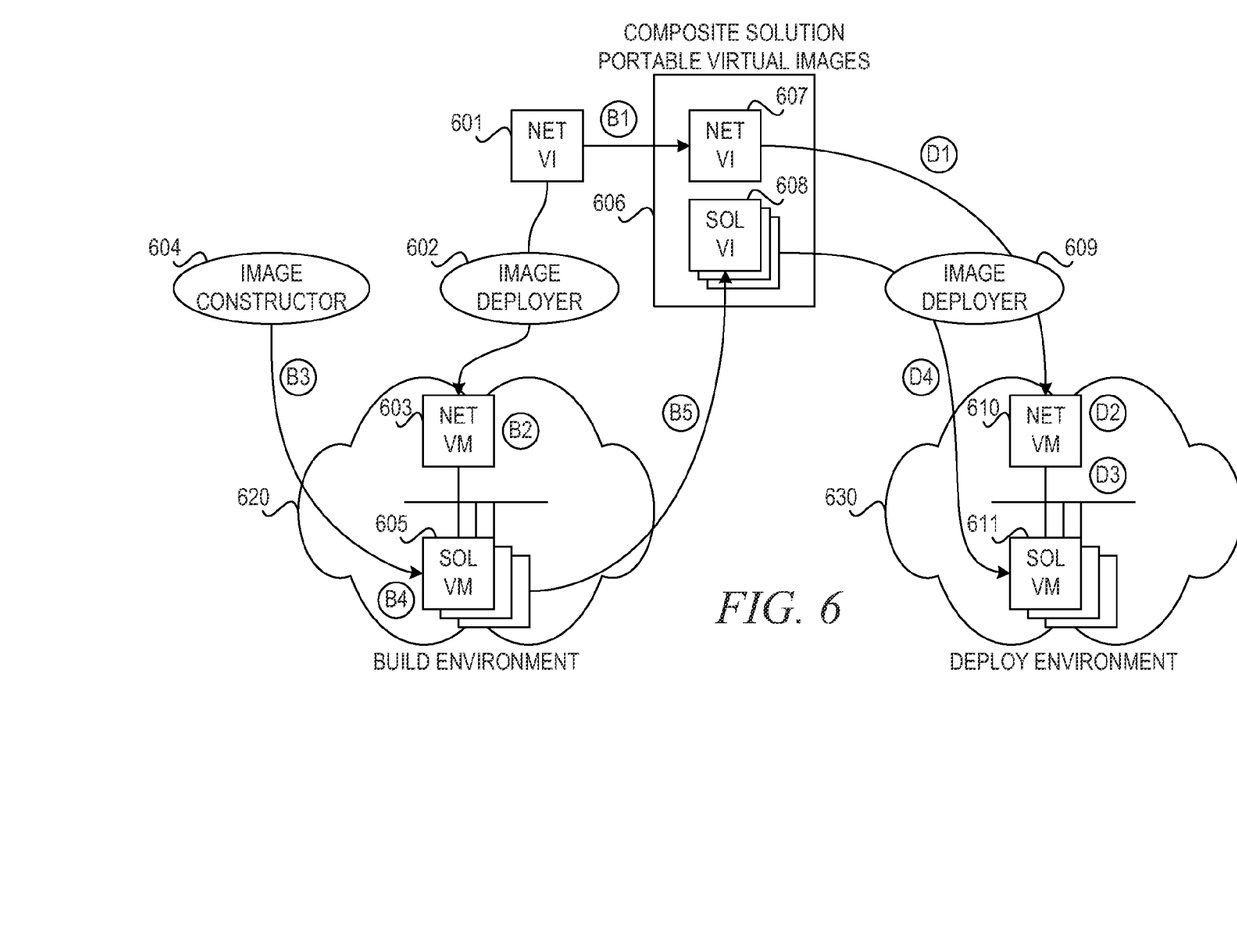
FIG. 6 depicts image building and deployment for a composite solution in accordance with an illustrative embodiment.

FIG. 6 depicts image building and deployment for a composite solution in accordance with an illustrative embodiment. In build operation B1, a mechanism for building a composite solution adds the network virtual image (NET VI) 601 to the composite solution set of images 606. The NET VI has networking functions including a router, such as a Layer-3 router, network address translator (NAT), firewall, and name server. In build operation B2, image deployer 602 deploys the network virtual machine (NET VM) 603 in build environment 620, and the mechanism configures the router to create a fixed private subnet (SOL_SUBNET) with a special set of fixed IP addresses (SOL_IP_LIST) and host names (SOL_HOST_LIST) for the composite solution. The mechanism configures the firewall so that no traffic leaves SOL_SUBNET unless it goes through the NAT. The mechanism also configures the name server with SOL_HOST_LIST mapped to SOL_IP_LIST.

In build operation B3, image constructor 604 installs middleware components and virtual machines 605 to the private subnet. In an example embodiment where existing images with preinstalled middleware components are on-boarded, the mechanism may discover the IP addresses configured in the virtual images and used in the middleware configuration. In build operation B4, the mechanism uses SOL_SUBNET, SOL_IP_LIST, and SOL_HOST_LIST to create the virtual machines (SOL VM) 605 and install the middleware components for the composite solution. In build operation B5, the mechanism captures the virtual machine images 605 and adds them to the composite solution set of images 606 as solution virtual images (SOL VI) 608. The network stack may be optimized to use techniques, such as remote direct memory access (RDMA) and single root IO virtuatization (SR-IOV), in NET VI 601 for improved performance.

In deploy operation D1, image deployer 609 deploys NET VI 607 as NET VM 610 to create the private subnet in the target deploy environment 630. In deploy operation D2, the mechanism obtains a set of externally accessible IP addresses (EXT_SOL_IP_LIST) in the target environment 630 assigned for the solution corresponding to a subset of SOL_IP_LIST. In deploy operation D3, the mechanism configures the NAT of NET VM 610 with EXT_SOL_IP_LIST and SOL_IP_LIST so only some of the solution virtual machines can be accessed externally with the assigned IP addresses. This can be done by using activation scripts inside the NET VM to configure anew gateway network interface card (NIC). The gateway NIC should match the gateway address configured in the solution virtual machines. In deploy operation D4, image deployer 609 deploys the solution virtual images 608 in the composite solution image set 606 to the private subnet as solution virtual machines (SOL VM) 611. The mechanism may use specialized hardware with faster network interface cards (e.g., 10 or 40 GhE with single root I/O virtualization (SR-IOV)) to deploy NET VI 607.

FIG. 7 is a block diagram illustrating virtual network interface pair forwarding in accordance with an illustrative embodiment. In the depicted example, at build time, a mechanism discovers a gateway network interface card (NIC) Internet protocol (IP) address for the virtual NIC (vNIC) 722 in each solution virtual machine (SOL VM) 720. At deploy time, the mechanism adds a new vNIC 712 in the network virtual machine (NET VM) 710 to match the IP address configured in the solution virtual machines 720.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be preformed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 8:
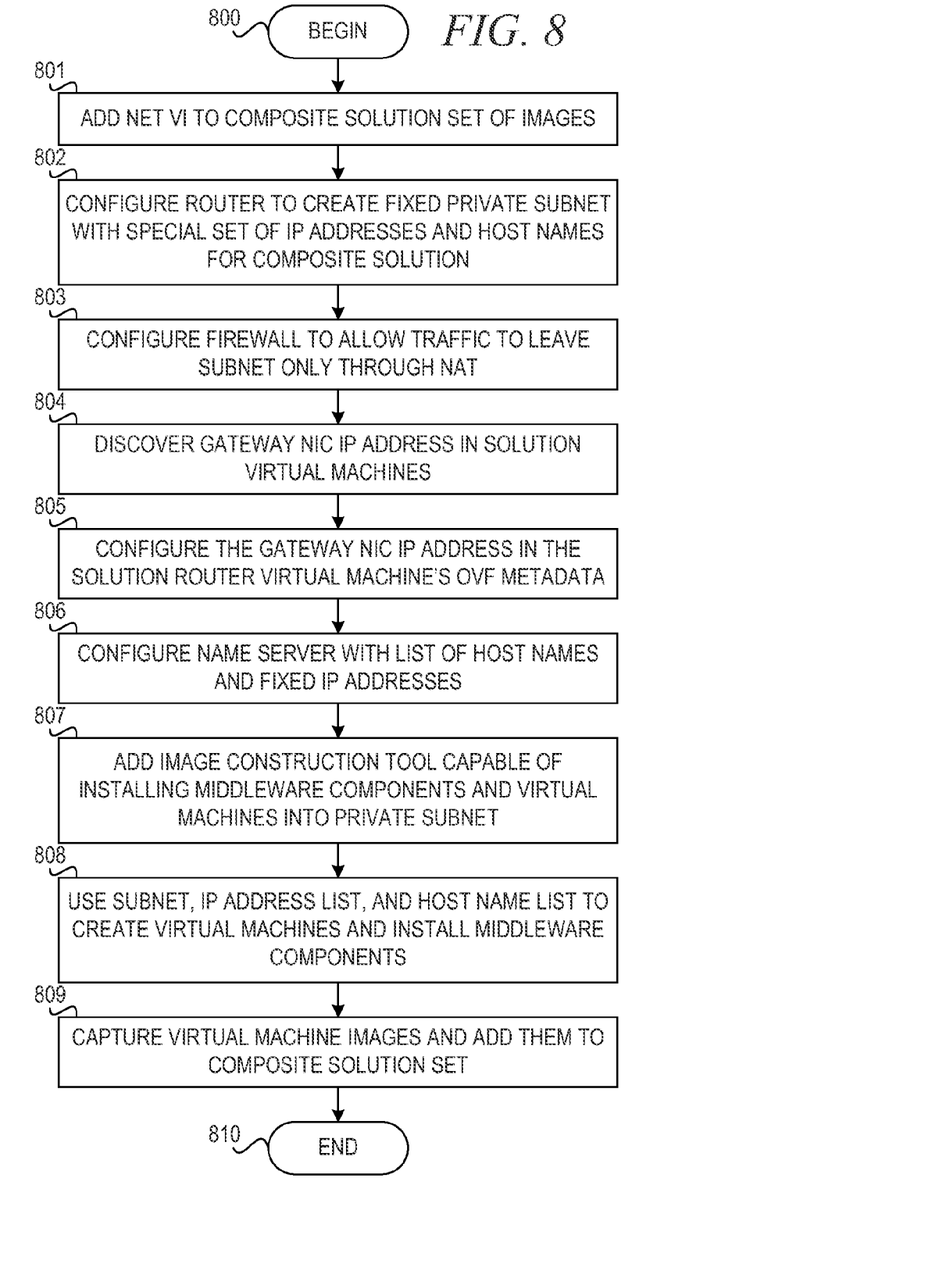
FIG. 8 is a flowchart illustrating operation of a mechanism for building a portable composite solution through virtual networking in accordance with an illustrative embodiment.

FIG. 8 is a flowchart illustrating operation of a mechanism for building a portable composite solution through virtual networking in accordance with an illustrative embodiment. Operation begins (block 800), and the mechanism adds the network virtual image to the composite solution set of images (block 801). The network virtual image has networking functions including a router, a network address translator (NAT), a firewall, and a name server. The mechanism then configures the router to create a fixed private subnet with a special set of fixed IP addresses and host names for the composite solution (block 802). The mechanism also configures the firewall to allow traffic to leave the private subnet only through the NAT (block 803). In addition, the mechanism may discover the gateway NIC IP address in the solution virtual machines (block 804) and configure the gateway NIC IP address in the solution router virtual machine's open virtualization format (OVF) metadata (block 805). The mechanism then configures the name server with the list of host names and the list of fixed IP addresses (block 806).

Then, the mechanism adds an image construction tool that is capable of installing middleware components and virtual machines into the private subnet (block 807). The image constructor uses the subnet, IP address list, and host name list to create virtual machines and to install middleware components for the composite solution (block 808). The mechanism then captures the virtual machine images and adds them to the composite solution set of images (block 809). Thereafter, operation ends (block 810).

Figure 9:
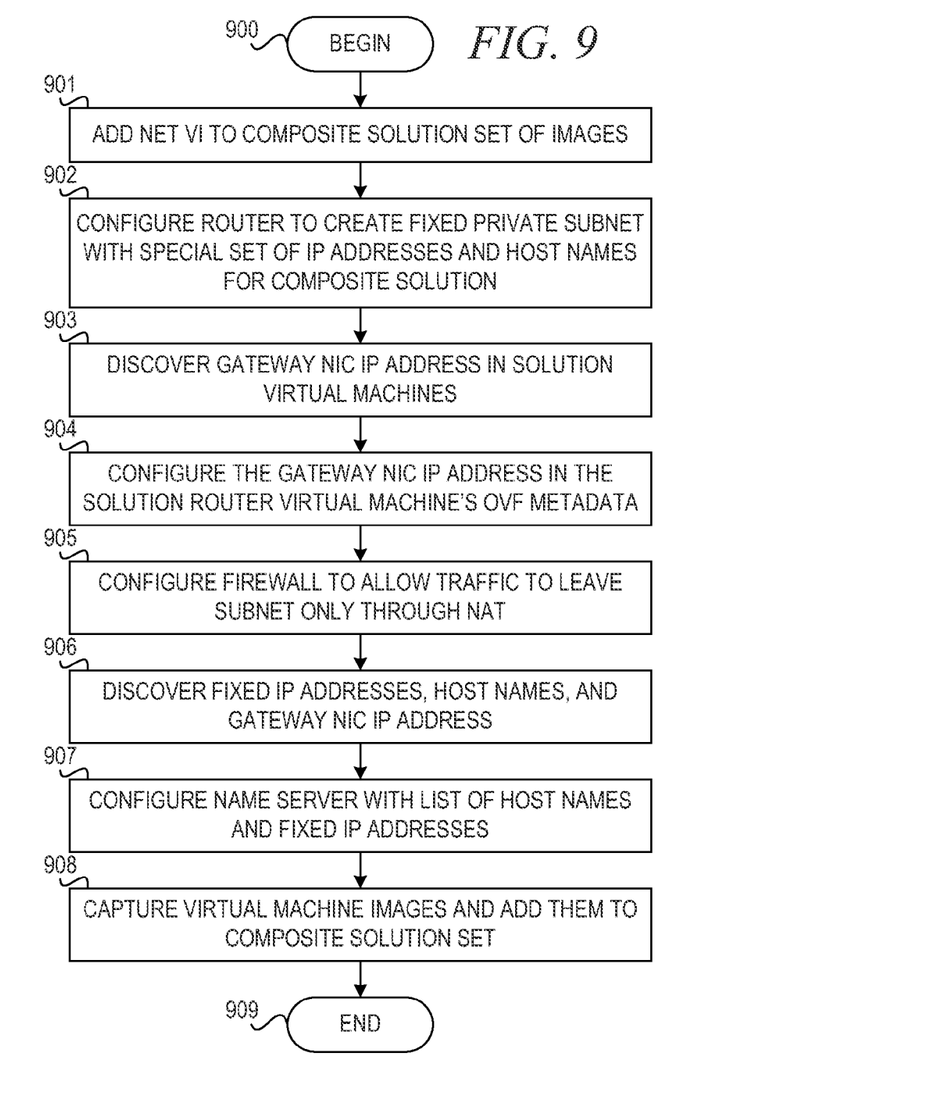
FIG. 9 is a flowchart illustrating operation of a mechanism for building a portable composite solution for virtual images with pre-installed middleware in accordance with an illustrative embodiment.

FIG. 9 is a flowchart illustrating operation of a mechanism for building a portable composite solution for virtual images with pre-installed middleware in accordance with an illustrative embodiment. Operation begins (block 900), and the mechanism adds the network virtual image to the composite solution set of images (block 901). The network virtual image has networking functions including a router, a network address translator (NAT), a firewall, and a name server. The mechanism then configures the router to create a fixed private subnet with a special set of fixed IP addresses and host names for the composite solution (block 902).

The mechanism discovers the gateway NIC IP address in the solution virtual machines (block 903) and configures the gateway NIC IP address in the solution router virtual machine's open virtualization format (OVF) metadata (block 904). The mechanism also configures the firewall to allow traffic to leave the private subnet only through the NAT (block 905). The mechanism then discovers the fixed IP addresses and host names in the solution virtual machines (block 906) and configures the name server with the list of host names and the list of fixed IP addresses (block 907). The mechanism then captures the virtual machine images and adds them to the composite solution set of images (block 908). Thereafter, operation ends (block 909).

Figure 10:
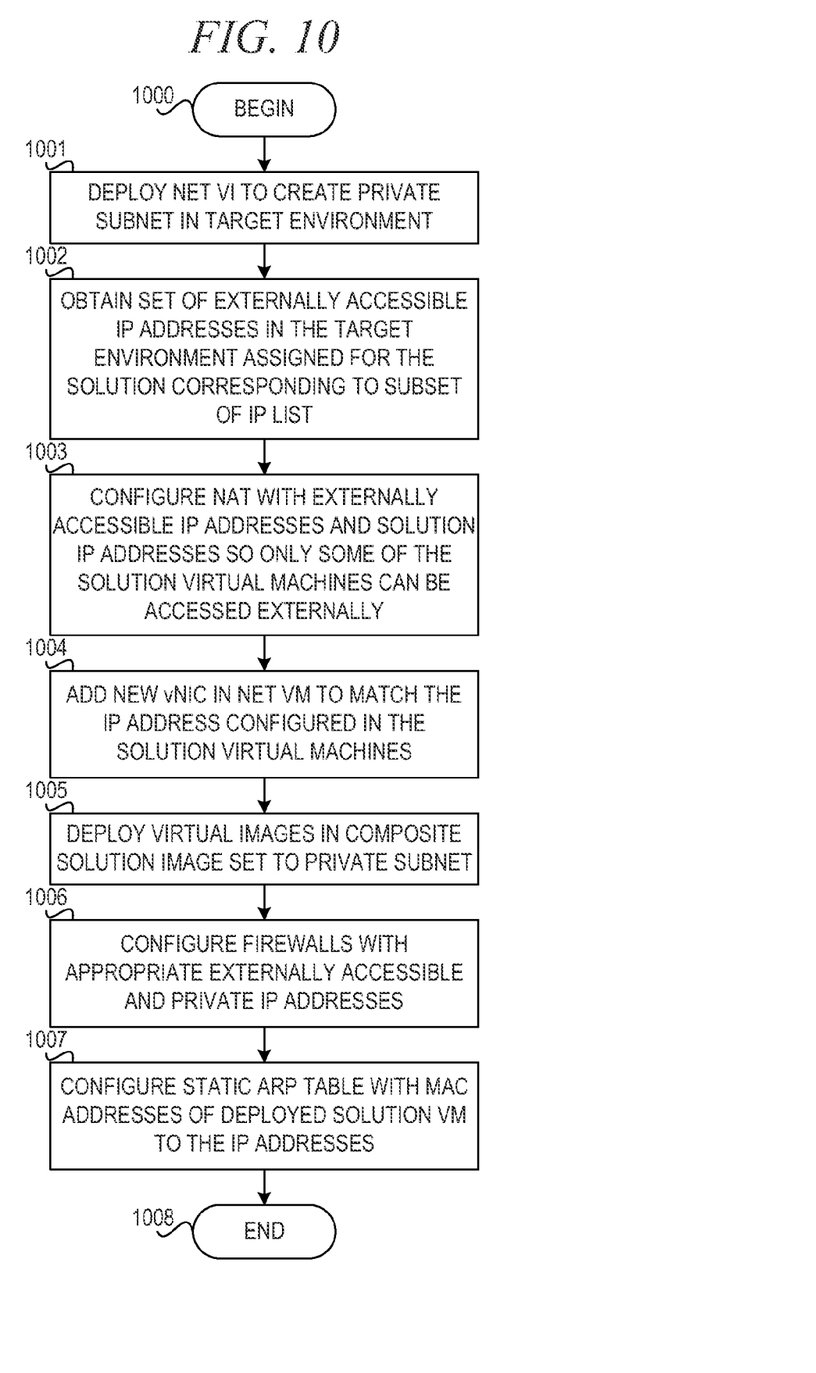
FIG. 10 is a flowchart illustrating operation of a mechanism for deploying a portable composite solution through virtual networking in accordance with an illustrative embodiment.

FIG. 10 is a flowchart illustrating operation of a mechanism for deploying a portable composite solution through virtual networking in accordance with an illustrative embodiment. Operation begins (block 1000), and the mechanism deploys the network virtual image to create the private subnet in the target environment (block 1001). The mechanism then obtains a set of externally accessible IP addresses in the target environment assigned for the solution corresponding to a subset of the solution IP address list (block 1002). The mechanism configures the NAT with the externally accessible IP addresses and the solution IP address list so only some of the solution virtual machines can be accessed externally with the assigned external IP addresses (block 1003). The mechanism adds a new virtual network interface card (vNIC) in the NET VM to match the gateway IP address configured in the solution VMs (block 1004).

Then, the mechanism deploys the virtual images in the composite solution image set to the private subnet (block 1005). The mechanism configures the firewalls with appropriate externally accessible and private IP addresses (block 1006). The mechanism configures a static ARP table with MAC addresses of deployed solution virtual machines to the IP addresses (block 1007). Thereafter, operation ends (block 1008).

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for building and for deploying portable composite solutions in virtual network environments. The mechanisms incorporate networking elements and their configurations into the process of virtual image creation and deployment. The mechanisms of the illustrative embodiments reduce composite solution deployment time. The mechanism also improves reuse of existing images and improves security by isolating network traffic between virtual images belonging to a composite solution.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for providing portable composite solutions, the method comprising:
    deploying a set of virtual images for a plurality of components of a composite solution to a build environment to form a set of virtual machines, wherein the plurality of components provide functions of the composite solution;
    deploying a network virtual image to the build environment to form a network virtual machine, wherein the network virtual machine comprises a router;
    configuring the muter to create a private subnet with a set of fixed addresses and set of host names for the composite solution;
    capturing the set of solution virtual machines as a set of solution virtual images; and storing the set of solution virtual images as a portable composite solution.

2. The method of claim 1, wherein the network virtual machine comprises a network address translator and a firewall, the method further comprising:
configuring the firewall so no traffic leaves the private subnet unless it goes through the network address translator.

3. The method of claim 1, wherein the network virtual machine comprises a name server, the method further comprising:
configuring the name server to map the set of host names to the set of fixed addresses.

4. The method of claim 1, further comprising:
deploying the network virtual machine to a target deploy environment to en private subnet in the target deploy environment;
obtaining an externally accessible address in the target deploy environment assigned for the composite solution;
configuring a network address translator of the deployed network virtual machine with the externally accessible address and the set of fixed addresses; and
deploying the set of solution virtual images of the portable composite solution to the private subnet to form a set of deployed solution virtual machines of a deployed portable composite solution.

5. The method of claim 4, further comprising:
configure a static address resolution protocol table with media access control addresses of the set of deployed solution virtual machines.

6. The method of claim 4, wherein configuring the network address translator comprises configuring the network address translator so at least one of the set of deployed solution virtual machines can be accessed externally with the externally accessible address.

7. The method of claim 4, wherein the target deploy environment is a cloud computing environment.

8. The method of claim 4, wherein the deployed portable composite solution is an instance of the portable composite solution migrated from a first cloud computing environment to a second cloud computing environment.

9. The method of claim 1, further comprising:
installing middleware components to the set of virtual machines for the composite solution.

10. The method of claim 1, further comprising:
discovering a gateway network interface address in a given solution virtual machine; and
configuring the gateway network interface address in metadata of the network virtual machine.

11. A computer program product comprising a computer readable storage medium having a computer readable program stored therein, wherein the computer readable program, when executed on a computing device, causes the computing device to:
deploy a set of virtual images for a plurality of components of a composite solution to a build environment to form a set of virtual machines, wherein the plurality of components provide functions of the composite solution;
deploy a network virtual image to the build environment to form a network virtual machine, wherein the network virtual machine comprises a router;
configure the router to create a private subnet with a set of fixed addresses and set of host names for the composite solution;
capture the set of virtual machines as a set of solution virtual images; and
store the set of solution virtual images as a portable composite solution.

12. The computer program product of claim 11, wherein the network virtual machine comprises a network address translator and a firewall, wherein the computer readable program further causes the computing device to:
configure the firewall so no traffic leaves the private subnet unless it goes through the network address translator.

13. The computer program product of claim 11, wherein the network virtual machine comprises a name server, wherein the computer readable program further causes the computing device to:
configure the name server to map the set of host names to the set of fixed addresses.

14. The computer program product of claim 11, wherein the computer readable program further causes the computing device to:
deploy the network virtual machine to a target deploy environment to create a private subnet in the target deploy environment;
obtain an externally accessible address in the target deploy environment assigned for the composite solution;
configure a network address translator of the deployed network virtual machine with the externally accessible address and the set of fixed addresses; and
deploy the set of solution virtual images of the portable composite solution to the private subnet to form a set of deployed solution virtual machines of a deployed portable composite solution.

15. The computer program product of claim 14, wherein configuring the network address translator comprises configuring the network address translator so at least one of the set of deployed solution virtual machines can be accessed externally with the externally accessible address.

16. The computer program product of claim 14, wherein the target deploy environment is a cloud computing environment.

17. The computer program product of claim 11, wherein the computer readable program is stored in a computer readable storage medium in a data processing system and wherein the computer readable program was downloaded over a network from a remote data processing system.

18. The computer program product of claim 11, wherein the computer readable program is stored in a computer readable storage medium in a server data processing system and wherein the computer readable program is downloaded over a network to a remote data processing system for use in a computer readable storage medium with the remote system.

19. An apparatus, comprising:
a processor; and
a memory coupled to the processor, wherein the memory comprises instructions which, when executed by the processor, cause the processor to:
deploy a set of virtual images for a plurality of components of a composite solution to a build environment to form a set of virtual machines, wherein the plurality of components provide functions of the composite solution;
deploy a network virtual image to the build environment to form a network virtual machine, wherein the network virtual machine comprises a router;
configure the router to create a private subnet with a set of fixed addresses and set of host names for the composite solution;
capture the set of virtual machines as a set of solution virtual images; and
store the set of solution virtual images as a portable composite solution.

20. The apparatus of claim 19, wherein the network virtual machine comprises a network address translator and a firewall, wherein the instructions further cause the processor to:
configure the firewall so no traffic leaves the private subnet unless it goes through the network address translator.

21. The apparatus of claim 19, wherein the network virtual machine comprises a name server, wherein the instructions further cause the processor to:
configure the name server to map the set of host names to the set of fixed addresses.

22. The apparatus of claim 19, wherein the instructions further cause the processor to:
deploy the network virtual machine to a target deploy environment to create a private subnet in the target deploy environment;
obtain an externally accessible address in the target deploy environment assigned for the composite solution;
configure a network address translator of the deployed network virtual machine with the externally accessible address and the set of fixed addresses so at least one of the set of deployed solution virtual machines can be accessed externally with the externally accessible address; and
deploy the set of solution virtual images of the portable composite solution to the private subnet to form a set of deployed solution virtual machines of a deployed portable composite solution.

23. The apparatus of claim 22, wherein the target deploy environment is a cloud computing environment.

* * * * *

UNITED STATES PATENT AND TRADEMARK OFFICE
CERTIFICATE OF CORRECTION

| | | |
|---|---|---|
| PATENT NO. | : 9,100,399 B2 | Page 1 of 1 |
| APPLICATION NO. | : 13/538164 | |
| DATED | : August 4, 2015 | |
| INVENTOR(S) | : Doyle et al. | |

It is certified that error appears in the above-identified patent and that said Letters Patent is hereby corrected as shown below:

Claims

Claim 1,
Col. 12, ln. 63, replace "muter" with --router--.

Claim 4,
Col. 13, ln. 15, replace "en" with --a--.

Signed and Sealed this
First Day of March, 2016

Michelle K. Lee
*Director of the United States Patent and Trademark Office*